(12) United States Patent
Hou

(10) Patent No.: US 8,247,928 B2
(45) Date of Patent: Aug. 21, 2012

(54) MOBILE PHONE AND POWER SUPPLY SYSTEM OF THE SAME

(75) Inventor: Zhen Hou, Guangdong (CN)

(73) Assignees: Premier Image Technology(China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 630 days.

(21) Appl. No.: 12/465,608

(22) Filed: May 13, 2009

(65) Prior Publication Data

US 2010/0141048 A1 Jun. 10, 2010

(30) Foreign Application Priority Data

Dec. 9, 2008 (CN) .......................... 2008 1 0306062

(51) Int. Cl.
*H01H 47/00* (2006.01)

(52) U.S. Cl. .......................................... 307/130; 307/31

(58) Field of Classification Search ................ 307/31, 307/130

See application file for complete search history.

(56) References Cited

U.S. PATENT DOCUMENTS

| | | | |
|---|---|---|---|
| 5,387,820 A * | 2/1995 | Imagawa | 307/31 |
| 5,877,564 A * | 3/1999 | Kuiri | 307/38 |
| 2009/0085649 A1* | 4/2009 | Kondo | 327/538 |
| 2010/0246857 A1* | 9/2010 | Kajita | 381/120 |

* cited by examiner

*Primary Examiner* — Jared Fureman
*Assistant Examiner* — Daniel Cavallari
(74) *Attorney, Agent, or Firm* — Altis Law Group, Inc.

(57) ABSTRACT

A mobile phone includes a signal processor, an operating module, and a power supply system. The working voltage of the operating module is bigger than that of the signal processor. The power supply system includes a power source, a voltage boosting unit, and a controller. The input terminal and output terminal of the voltage boosting unit is connected to the power source and the operating module respectively. The controller is configured for connecting the signal processor to the power source or the output terminal of the voltage boosting unit corresponding to the output voltage of the power source being bigger or smaller than a preset threshold voltage.

18 Claims, 2 Drawing Sheets

MOBILE PHONE AND POWER SUPPLY SYSTEM OF THE SAME

BACKGROUND

1. Technical Field

The present disclosure relates to mobile phones and, particularly, to a power supply system of a mobile phone.

2. Description of Related Art

In recent years, various devices with corresponding functions have been developed and added to mobile phones, such as cameras and video cameras. If the mobile phone suddenly receives a call while performing one of the added functions, the current output from a battery of the mobile phone will be greatly increased immediately. As a result, the output voltage of the battery may drop too much due to inner resistance of the battery, and fail to support the signal processor, and possibly cause the mobile phone to shut down.

What is needed, therefore, is a power supply system of a mobile phone to overcome or at least alleviate the above-described problems.

BRIEF DESCRIPTION OF THE DRAWINGS

Many aspects of the present mobile phone and power supply system can be better understood with reference to the accompanying drawings. The components in the drawings are not necessarily drawn to scale, the emphasis instead being placed upon clearly illustrating the principles of the present mobile phone and power supply system.

DETAILED DESCRIPTION

Embodiments of the present disclosure will now be described in detail below, with reference to the accompanying drawings.

Figure 1:
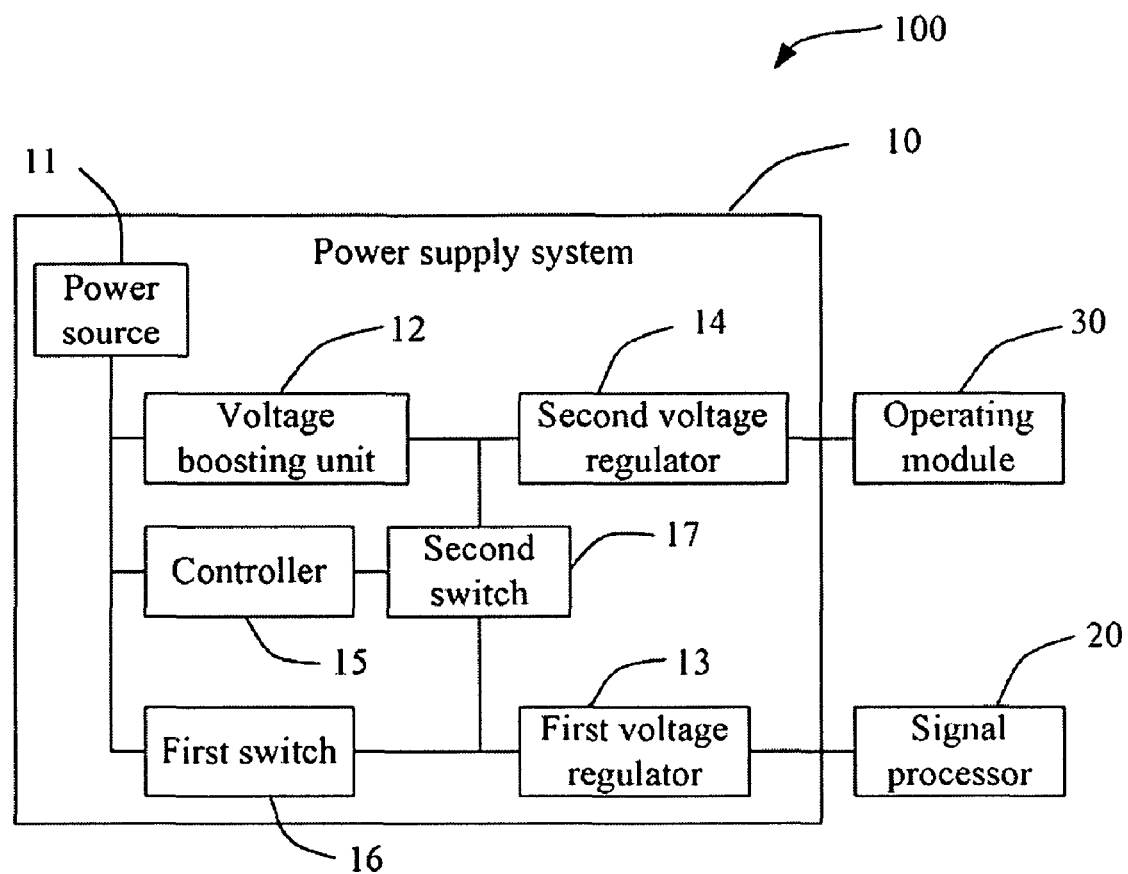
FIG. 1 is a functional block diagram of a mobile phone according to an exemplary embodiment.

Referring to FIG. 1, a mobile phone 100, according to an exemplary embodiment, is shown. The mobile phone 100 includes a power supply system 10, a signal processor 20, and an operating module 30. The working voltage of the operating module 30 is bigger than that of the signal processor 20. In the present embodiment, the operating module 30 is an image processor for a camera of the mobile phone 100.

The power supply system 10 includes a power source 11, a voltage boosting unit 12, a first voltage regulator 13, a second voltage regulator 14, a controller 15, a first switch 16, and a second switch 17.

The power source 11 is configured to provide power to the mobile phone 100. The power source 11 can be a lithium battery, etc.

The first switch 16 is connected between the power source 11 and the input terminal of the first voltage regulator 13. The output terminal of the first voltage regulator 13 is connected to the signal processor 20 and provides a steady voltage to the signal processor 20. The first voltage regulator 13 can be a linear voltage regulator, such as a low dropout regulator.

The input terminal of the voltage boosting unit 12 is connected to the power source 11, and the output terminal of the voltage boosting unit 12 is connected to the input terminal of the second voltage regulator 14. The output terminal of the second voltage regulator 14 is connected to the operating module 30 to provide a steady voltage to the operating module 30. Because the working voltage of the operating module 30 is bigger than that of the signal processor 20, the output voltage of the second voltage regulator 14 should be bigger than that of the first voltage regulator 13. The second voltage regulator 14 can be a linear voltage regulator, such as a low dropout regulator.

The second switch 17 is connected between the input terminal of the first voltage regulator 13 and the output terminal of the voltage boosting unit 12. The second switch 17 is also connected to the controller 15.

Figure 2:
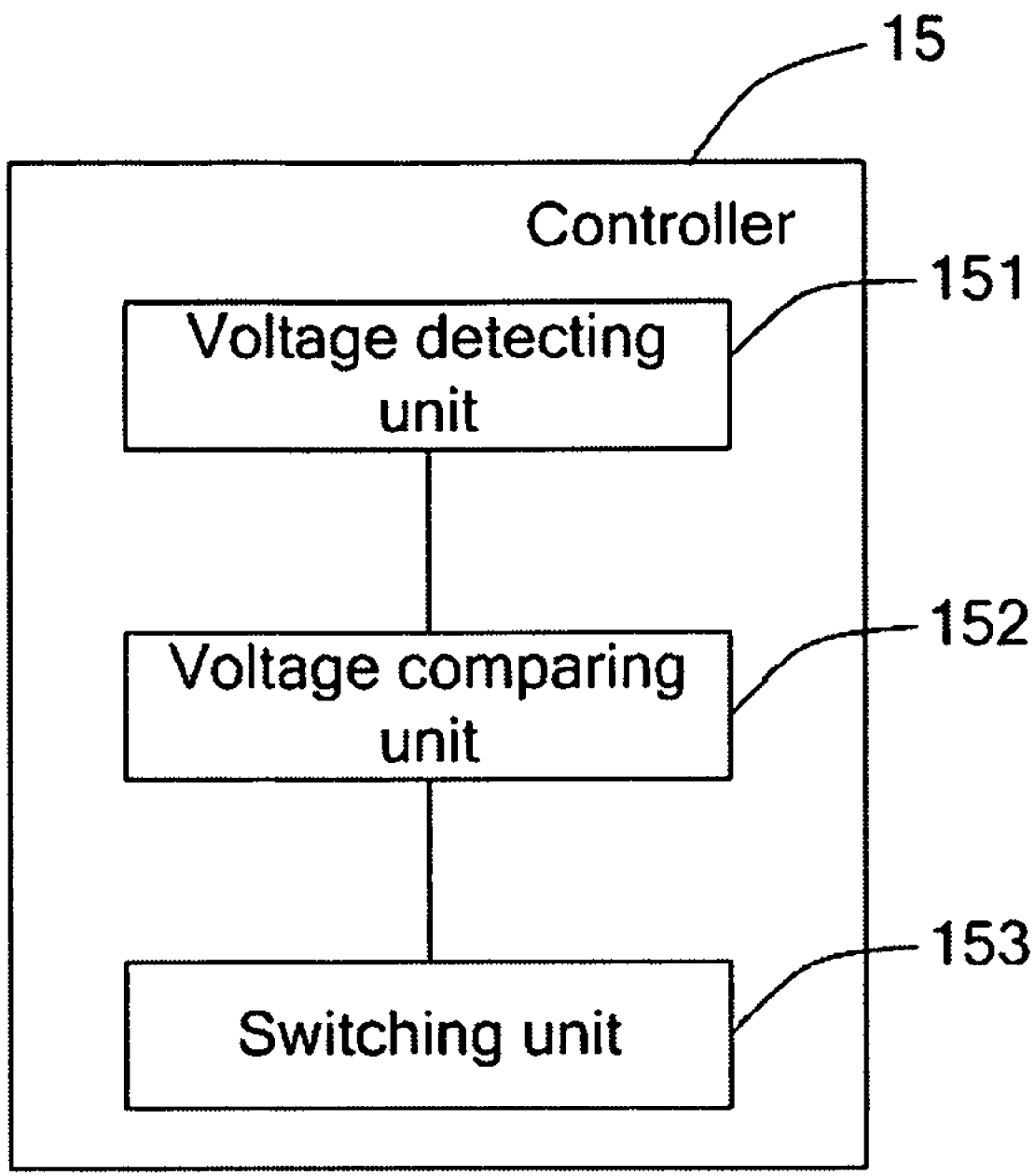
FIG. 2 is a functional block diagram of a controller of a power supply system of the mobile phone of FIG. 1.

Referring to FIG. 2, the controller 15 includes a voltage detecting unit 151, a voltage comparing unit 152, and a switching unit 153. The voltage detecting unit 151 is configured for detecting the output voltage of the power source 11. The voltage comparing unit 152 is configured for comparing the output voltage of the power source 11 to a preset threshold voltage, and determining whether the output voltage of the power source 11 is smaller than the preset threshold voltage. The preset threshold voltage can be a minimal voltage capable of supporting the signal processor 20 working normally. Normally, the output voltage of the power source 11 is bigger than the preset threshold voltage, and the switching unit 153 keeps the first switch 16 switching on, and the second switch 17 switching off. When the output voltage of the power source 11 is smaller than the preset threshold voltage, the switching unit 153 will switch on the second switch 17 and switch off the first switch 16. Because the output voltage of the voltage boosting unit 12 is bigger than that of the power source 11, the signal processor 20 can also keep working normally.

The first voltage regulator 13 is only used to provide a steady voltage for the signal processor 20, and the second voltage regulator 14 is used to provide a steady voltage for the operating module 30. In other embodiments, the first voltage regulator 13 and the second voltage regulator 14 can also be omitted.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. A mobile phone comprising:
   a signal processor;
   an operating module with a working voltage bigger than that of the signal processor; and
   a power supply system comprising:
      a power source;
      a voltage boosting unit with an input terminal and an output terminal thereof connected to the power source and the operating module, respectively;
      a first switch connected between the power source and the signal processor;
      a second switch connected between the output terminal of the voltage boosting unit and the signal processor; and
      a controller configured for connecting the signal processor to the power source or the output terminal of the voltage boosting unit, both the first switch and the second switch controlled by the controller, the controller figured for comparing the output voltage of the power source to a preset threshold voltage, and determining whether the output voltage of the power source being smaller than the preset threshold voltage, when the output voltage of the power source is bigger than the preset threshold voltage, and the controller keeps the first switch switching on, and the second switch switching off, when the output voltage of the power source is smaller than the preset threshold voltage, the controller switches on the second switch and switch off the first switch.

2. The mobile phone as claimed in claim 1, wherein the mobile phone further comprises a first voltage regulator, the input terminal of the first voltage regulator is connected to the first switch and the second switch, and the output terminal of the first voltage regulator is connected to the signal processor.

3. The mobile phone as claimed in claim 2, wherein the first voltage regulator is a linear voltage regulator.

4. The mobile phone as claimed in claim 3, wherein the linear voltage regulator is a low dropout regulator.

5. The mobile phone as claimed in claim 1, wherein the mobile phone further comprises a second voltage regulator, the input terminal of the second voltage regulator is connected to output terminal of the voltage boosting unit, and the output terminal of the second voltage regulator is connected to the operating module.

6. The mobile phone as claimed in claim 5, wherein the second voltage regulator is a linear voltage regulator.

7. The mobile phone as claimed in claim 6, wherein the linear voltage regulator is a low dropout regulator.

8. The mobile phone as claimed in claim 1, wherein the preset threshold voltage is a minimal voltage capable of supporting the signal processor to work normally.

9. The mobile phone as claimed in claim 1, wherein the operating module is an image processor for a camera of the mobile phone.

10. The mobile phone as claimed in claim 1, wherein the controller comprises: a voltage detecting unit for detecting the output voltage of the power source, a voltage comparing unit for comparing the output voltage of the power source to the preset threshold voltage and determining whether the output voltage of the power source is smaller than the preset threshold voltage, and a switching unit for switching on or off the first switch and the second switch.

11. A power supply system for a mobile phone, the mobile phone comprising a signal processor and an operating module with a working voltage bigger than that of the signal processor, the power supply system comprising:
   a power source;
   a voltage boosting unit with an input terminal and an output terminal thereof connected to the power source and the operating module respectively;
   a first switch connected between the power source and the signal processor;
   a second switch connected between the output terminal of the voltage boosting unit and the signal processor; and
   a controller configured for connecting the signal processor to the power source or the output terminal of the voltage boosting unit, both the first switch and the second switch controlled by the controller, the controller configured for comparing the output voltage of the power source to a preset threshold voltage, and determining whether the output voltage of the power source being smaller than the preset threshold voltage, when the output voltage of the power source is bigger than the preset threshold voltage, and the controller keeps the first switch switching on, and the second switch switching off, when the output voltage of the power source is smaller than the preset threshold voltage, the controller switches on the second switch and switch off the first switch.

12. The power supply system as claimed in claim 11, wherein the power supply system further comprises a first voltage regulator, the input terminal of the first voltage regulator connected to the first switch and the second switch, and the output terminal of the first voltage regulator is connected to the signal processor.

13. The power supply system as claimed in claim 12, wherein the first voltage regulator is a low dropout regulator.

14. The power supply system as claimed in claim 11, wherein the power supply system further comprises a second voltage regulator, the input terminal of the second voltage regulator is connected to output terminal of the voltage boosting unit, and the output terminal of the second voltage regulator is connected to the operating module.

15. The power supply system as claimed in claim 14, wherein the second voltage regulator is a low dropout regulator.

16. The power supply system as claimed in claim 11, wherein the preset threshold voltage is a minimal voltage capable of supporting the signal processor working normally.

17. The power supply system as claimed in claim 11, wherein the operating module is an image processor for a camera of the mobile phone.

18. The power supply system as claimed in claim 11, wherein the controller comprises: a voltage detecting unit for detecting the output voltage of the power source, a voltage comparing unit for comparing the output voltage of the power source to the preset threshold voltage and determining whether the output voltage of the power source is smaller than the preset threshold voltage, and a switching unit for switching on or off the first switch and the second switch.

* * * * *